United States Patent [19]
Hoover et al.

[11] Patent Number: 4,910,420
[45] Date of Patent: Mar. 20, 1990

[54] BRUSHLESS ELECTRIC MOTOR

[75] Inventors: John W. Hoover, Huntington; Allen C. Potter, Litchfield; Anthony C. Laraia, Torrington, all of Conn.

[73] Assignee: Nidec Corporation, Torrington, Conn.

[21] Appl. No.: 225,089

[22] Filed: Jul. 27, 1988

[51] Int. Cl.$^4$ .......................................... H02K 11/00
[52] U.S. Cl. ..................................... 310/68 B; 310/42; 29/596
[58] Field of Search ...................... 310/68 R, 68 B, 42, 310/43; 29/596, 598; 318/138, 254

[56] References Cited

U.S. PATENT DOCUMENTS

| | | | |
|---|---|---|---|
| 3,191,135 | 6/1965 | Hazelquist | 336/65 |
| 3,596,139 | 7/1971 | Walsh | 310/101 R |
| 4,003,128 | 1/1977 | Dochterman | 29/596 |
| 4,099,104 | 7/1978 | Müller | 318/138 |
| 4,115,715 | 9/1978 | Müller | 310/68 B |
| 4,357,550 | 11/1982 | Müller | 310/43 |
| 4,519,010 | 5/1985 | Elaesser et al. | 360/97 |
| 4,540,906 | 8/1985 | Blom | 310/67 R |
| 4,604,665 | 8/1986 | Müller et al. | 360/97 |
| 4,633,110 | 12/1986 | Genco et al. | 310/71 |
| 4,703,209 | 10/1987 | Wrobel | 310/67 R |
| 4,779,330 | 10/1988 | Genco et al. | 310/42 |
| 4,800,307 | 1/1989 | Papst | 310/67 R |

FOREIGN PATENT DOCUMENTS

| | | |
|---|---|---|
| 7909080 | 7/1979 | Fed. Rep. of Germany . |
| 3144630.2 | 5/1983 | Fed. Rep. of Germany . |
| 2415839.2 | 7/1983 | Fed. Rep. of Germany . |
| 7824009.2 | 6/1984 | Fed. Rep. of Germany . |
| 81386923 | 9/1984 | Fed. Rep. of Germany . |
| 3427994 | 1/1986 | Fed. Rep. of Germany . |
| 87124866 | 12/1987 | Fed. Rep. of Germany . |
| 23001 | 3/1978 | Japan . |

OTHER PUBLICATIONS

Electronic Design Apr. 1987, p. 146, Hall Sensor Shares IC with Power Devices (no Author).

Primary Examiner—Patrick R. Salce
Assistant Examiner—Judson H. Jones
Attorney, Agent, or Firm—McCormick, Paulding & Huber

[57] ABSTRACT

A novel brushless electric motor is characterized by a printed circuit board having at least one integral portion extending from the printed circuit board plane for establishing the interrelationship between the printed circuit board and another motor component. The present motor has a more precisely located triggering sensor for the commutation circuit and is readily adapted to automated assembly by the use of the present printed circuit board.

22 Claims, 2 Drawing Sheets

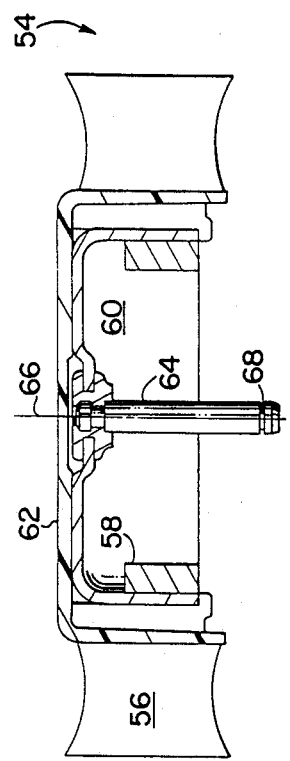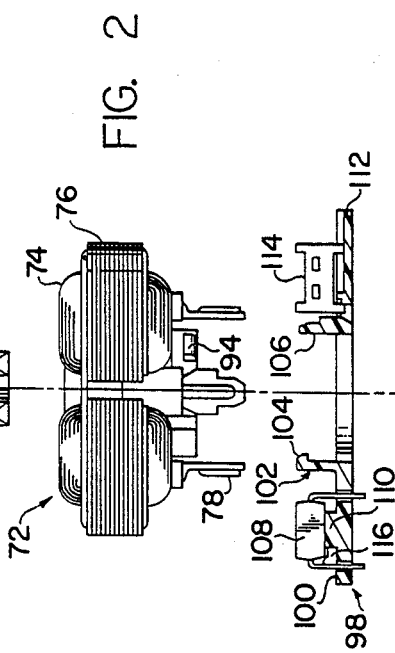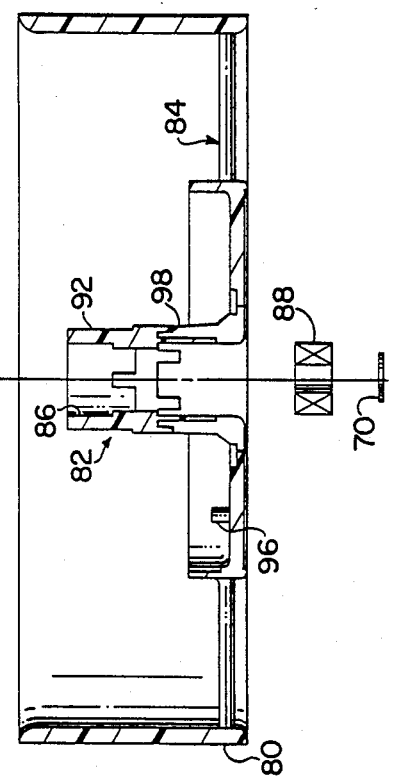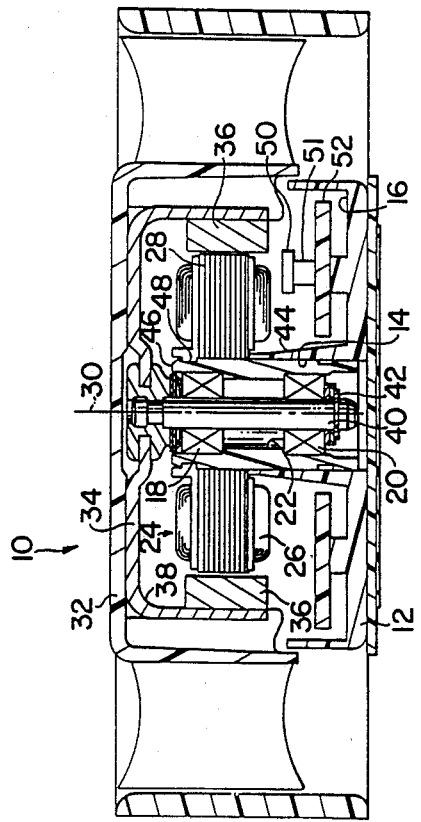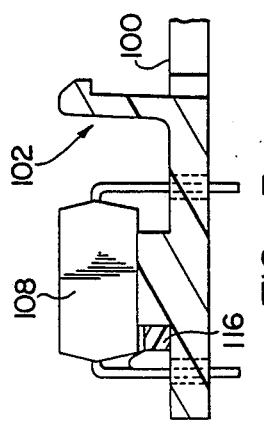

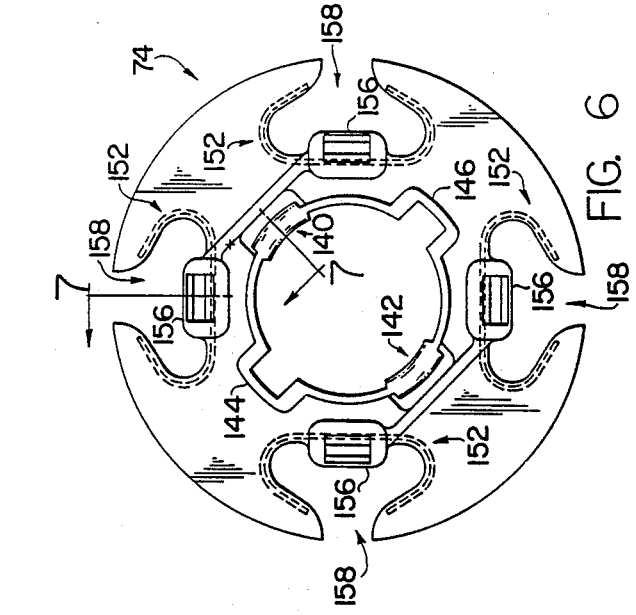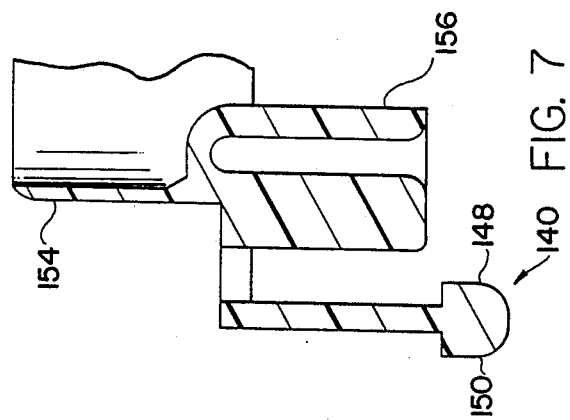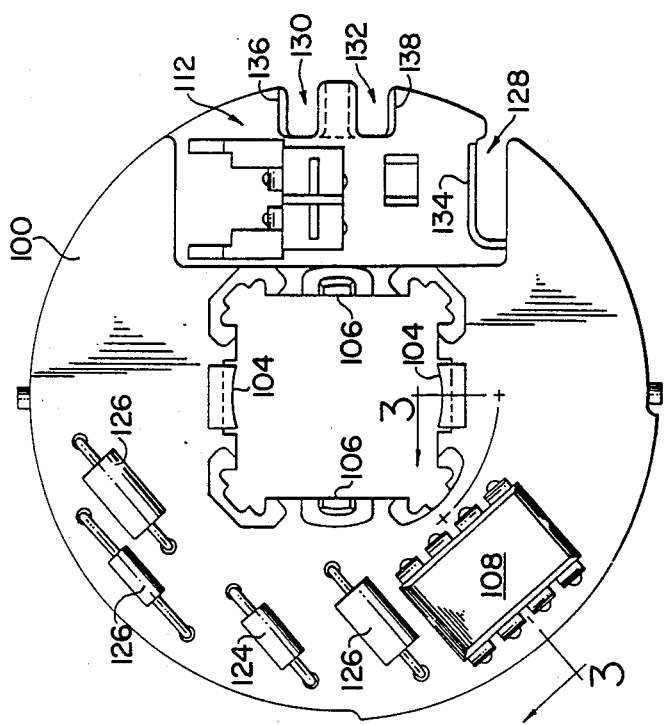

BRUSHLESS ELECTRIC MOTOR

TECHNICAL FIELD

This invention relates to brushless electric motors and more particularly to brushless fan motors characterized by a molded printed circuit board having at least one integral portion extending from a surface thereof for locating the printed circuit board with respect to at least one other motor component.

BACKGROUND OF THE INVENTION

Brushless electric motors are well known in the art and are characterized by internal electric circuitry which provides electrical commutation. Brushless direct current (D.C.) motors are routinely produced in high volume for use in a multitude of industrial applications such as fan motors. As a result, it is imperative that the design of the motor be simple, and that it can be adapted to low cost automated manufacture and assembly techniques.

Known brushless direct current motors include the electric fan motor No. TA 300 D.C. manufactured by the NIDEC Corporation of Torrington, Connecticut. This motor includes a rotor having an external impeller and a housing. Concentric with the rotor is a stator and a printed circuit board, both mounted within the housing. On the printed circuit board are electrical components which comprise a commutating circuit. The circuit contains a sensor, typically a Hall cell, which is used as a trigger. Such sensors are characterized by a limited range, and therefore must be carefully located with respect to the stator and the rotor.

The precision with which the sensor must be positioned has limited the extent to which the motor assembly can be automated. Known motors are assembled from discrete subassemblies, with the sensor located on one subassembly (a printed circuit board), while the stator comprises another. Production tolerances of known subassemblies will, when configured together, often produce a stator-sensor relative position which will be out of the sensor's range in an unacceptable number of motors.

For example, while stators of a known design can be snapped onto a bearing tower assembly within the housing, tolerances in stator magnet laminations must be considered in the design of the snap engagement mechanism. As a result of the clearance needed for stator magnet laminations, the stator can be located with respect to the bearing tower only with limited precision. The printed circuit board containing the sensor is fixed separately to the housing, and will then have an unacceptably wide range of vertical and angular positions with respect to the stator.

Since the printed circuit board is two dimensional and lacks any intrinsic means for fixturing, it must be manually affixed within the housing at a position which will ensure that the sensor is located within its range. The absence of any self-fixturing mechanism with the printed circuit board also precludes the use of automated assembly techniques with respect to the printed circuit board and ultimately limits the adoption of automated assembly techniques with respect to the other motor components.

To accomplish precise sensor location, known brushless electric motors using a conventional two dimensional printed circuit board require separate positioning of the magnetic sensor out from the plane of the printed circuit board. These motors are characterized by a separate pedestal or an equivalent that must be attached to the printed circuit board. A separate pedestal offers only marginal improvement in the accuracy of sensor location and adds another labor intensive step to the motor assembly process.

It would be advantageous to have an electric motor characterized by a printed circuit board which includes a mechanism allowing for self-fixturing and simplified assembly with other motor components, and which further would provide for a precisely located sensor. The present invention is drawn towards such a motor.

SUMMARY OF THE INVENTION

An object of the present invention is to provide for a motor having a printed circuit board characterized by an integral projection therefrom for locating the printed circuit board with at least one other motor component.

Another object of the present invention is to provide for a brushless motor having a printed circuit board characterized by an integral projection on which is mounted a triggering sensor, part of an electrical commutation circuit.

Another object of the present invention is to provide for a motor having a snap engagement mechanism for locating a stator with respect to a housing such that the precision with which the stator is located is independent of the production tolerances of any other motor component.

According to the present invention, an electric motor includes a housing, a stator and a rotor in coaxial relationship therewithin. The stator comprises an electromagnet and a support therefor. The motor also includes a printed circuit board of molded construction which carries a commutating circuit for cooperation with the rotor. The printed circuit board is disposed adjacent one axial end of the stator and has one portion departing from the remainder thereof. The printed circuit board also includes at least one precisely located surface for the accurate interrelationship of the printed circuit board with at least one other motor component.

According to another aspect of the present invention, an electric motor comprises a housing, a stator and a rotor in coaxial relationship therewithin. The stator comprises an electromagnet and a support therefor as well as a printed circuit board of molded construction. The printed circuit board carries a commutating circuit for cooperation with the rotor. The printed circuit board is disposed adjacent one axial end of the stator and the rotor and has at least one integral, generally axial projection with a first snap engagement mechanism adjacent the free end portion thereof. The projection extends toward the stator and the stator support has a complementary second snap engagement mechanism for cooperation with the first snap engagement mechanism to secure the stator and printed circuit board in an assembled relationship.

According to still another aspect of the present invention, an electric motor includes a housing, a stator and a rotor in coaxial relationship therewithin. The stator comprises an electromagnet and a support therefor. A printed circuit board of molded construction is included. The printed circuit board carries a commutating circuit, including a sensor, for cooperation with the rotor. The printed circuit board is disposed adjacent one axial end of the stator and the rotor and has at least one integral, generally axial projection with a precisely located surface located at a free end portion thereof. The free end portion generally faces the stator and the rotor with a sensor mounted on the surface for cooperation with the rotor.

According to still another aspect of the present invention, an electric motor includes a housing, a rotor having a central shaft and a permanent magnet located on a rotor periphery. A stator is also included and is configured to be coaxial with the rotor and has an electromagnet with a central tubular support therefor. The stator further comprises a first snap engagement mechanism. Also included in the motor is a bearing tower centrally positioned in the housing that extends from an interior surface thereof. The bearing tower is adapted to slidably receive, in an outer surface thereof, the tubular stator support. The bearing tower further has a second snap engagement mechanism adjacent to the housing interior surface. The second snap engagement mechanism is cooperative with the first snap engagement mechanism to secure the bearing tower and stator in an assembled relationship.

BRIEF DESCRIPTION OF THE DRAWINGS

FIG. 1 is a sectioned illustration of a known motor.

FIG. 2 is an exploded sectioned illustration of a motor provided according to the present invention.

FIG. 3 is a detailed sectioned illustration of a portion of a printed circuit board of the motor of FIG. 2.

FIG. 4 is a top illustration showing the printed circuit board of the motor of FIG. 2.

FIG. 5 is a side illustration of a portion of the printed circuit board of FIG. 3.

FIG. 6 is a top view of a stator support of the motor of FIG. 2.

FIG. 7 is a sectioned illustration of a portion of the stator support of FIG. 5.

DESCRIPTION OF THE PREFERRED EMBODIMENT

Referring now to FIG. 1, there is illustrated, in section, a known electric motor 10. The motor comprises a housing 12 having a tubular bearing tower 14 centrally configured on an inner surface 16 of the housing. The bearing tower 14 typically comprises a turned metal bearing tower having bearings 18 and 20 located in a tower inner surface 22.

A stator 24 comprises a support mechanism 26 which receives a plurality of laminations 28. The stator preferably comprises two wound electromagnets whose poles are spaced 90 degrees apart about a central axis 30 and include the laminations.

An impeller 32 is preferably formed from plastic. A rotor 34 has a permanent magnet 36 formed on an inner surface 38 as well as a central shaft 40. The rotor shaft is received through the opening in the bearing tower and is secured by snap ring 42.

The fan 10 is characterized by a bearing tower outer surface 44 having a mechanism formed therein to receive a corresponding mechanism formed in an inner surface of the stator support mechanism such that the bearing tower is snap engaged with the stator. The snap engagement mechanism preferably comprises a tab 46 formed on the bearing tower outer surface at an outer, distal end of the tower, and a corresponding recess 48 formed in the support mechanism inner surface.

Note that the snap engagement mechanism is configured at the outer end of the bearing tower. The construction of the stator electromagnet is such that the clearance needed to accommodate variations in the lamination thickness limit the precision with which the snap mechanism can configure the stator with respect to the other motor components. This construction therefore limits the accuracy with which the stator can be located with respect to a commutating trigger sensor 50 mounted on pedestal 51 on a printed circuit board 52.

In the motor 10 the pedestal is snap engaged to the printed circuit board. Other motors have the triggering sensor freestanding on leads. The sensor, typically a Hall effect device, must be precisely positioned beneath an opening (not shown) between adjacent poles of the electromagnets. The vertical displacement from the electromagnet poles as well as the angular position of the sensor relative to the poles is critical for the proper operation of the motor. The motor 10 cannot be assembled in a fully automated manner since the summation of the tolerances in (1) the assembled location of the printed circuit board, (2) the snap engagement mechanism of the stator to the bearing tower and (3) the assembled location of the sensor on the printed circuit board will too often result in an unacceptable sensor location.

Referring now to FIG. 2, there is shown in an exploded sectioned illustration, a motor 54 provided according to the present invention. The motor 54 includes an impeller 56. Inside the impeller is a permanent magnet 58 fixed to an interior surface 60 of a rotor 62. The rotor has a centrally located shaft 64 along axis 66 about which the rotor will spin. At a distal end of the post is a groove 68 for receiving snap ring 70 that is used in a known manner for locating the rotor with respect to the other motor components.

A stator 72 is concentric with the rotor and comprises a plastic support 74 adapted to receive a plurality of laminations 76. A support cover (not shown) of a known type can also be included. An opposed pair of electromagnets is formed in a known manner which includes the laminations. The stator support is configured to have a central tubular opening and a plurality of electrical connectors 78 which extend from the stator support.

The motor 54 also comprises a housing 80 having a centrally located bearing tower 82 projecting from an inner housing surface 84. In the preferred embodiment, the housing and bearing tower are integrally molded of plastic. The bearing tower is tubular, and has an inner surface 86 adapted to receive bearings 88 and 90. The shaft 64 is received by the bearings and affixed to the housing by the snap ring 70 when the motor is completely assembled.

Additionally, the bearing tower has an outer surface 92 that has a recess 93. The stator support has a projection 94 extending toward the housing inner surface. The projection inner surface, together with the bearing tower recess comprise a snap engagement mechanism. The present snap engagement mechanism is preferably located adjacent to the housing inner surface 84.

As noted hereinabove, known motors employing a snap engaged stator position the snap engagement mechanism at a free end of the bearing tower, yielding a stator that is not precisely located with respect to a commutation sensor. However, with the present invention the precision of the positioning of the stator with respect to the bearing tower is independent of the tolerance of the stator laminations, or the tolerances of any other motor component. In turn, the accurately located stator produces less variation in the position of the stator with respect to a sensor.

Also included in motor 54 is a locating post 96 which is molded with the housing to extend from the inner surface. As detailed hereinafter, the post 96 is configured to be in registration with an electrical element on a printed circuit board which contains a commutation circuit trigger sensor. The length of the post 96 is selected to contact the printed circuit board and adjust or limit the displacement of the printed circuit board from the housing inner surface. Since the sensor is positioned on the integral pedestal, the position of the sensor relative to the rotating magnet is controlled by the height of the post.

A printed circuit board 98 is also included in the motor for locating electrical components that comprise the requisite commutation circuitry. The printed circuit board in the preferred embodiment is molded and is characterized by one or more integral surfaces which depart from a plane 100 of the board. Although preferably generally planar, those skilled in the art will note that the printed circuit board can be nonplanar and can be formed to be received by other motor components, such as the housing. Nonplanar is defined to include surfaces which are arcuate throughout, or at least partially arcuate, as well as planar surfaces with at least a portion thereof which departs from the plane of the surface. Included by this definition therefore are printed circuit boards having a curved or a planar surface where a portion departs from the remainder of the surface at an angle as well as curved or planar printed circuit boards which include a portion that is raised or recessed from the remainder of the surface. A printed circuit board of the type used in the present motor is detailed in the copending commonly owned U.S. patent application Ser. No. 225,090 entitled "A Printed Circuit Board For Use with a Molded Brushless Electric Motor", and incorporated herein by reference. For example, a first projection 102 extends from the printed circuit board plane and further comprises an integral tab 104 at a distal end thereof. As detailed hereinafter, the tab comprises a means for snap engagement to a cooperative element surface in the stator support.

Also extending from the surface of the printed circuit board is a second projection 106 which keys the printed circuit board to the stator so that the stator may receive the printed circuit board in only one relative position. The extending key 106 is received by a cooperative element on the stator support and also prevents relative rotation of the printed circuit board with respect to the stator. Those skilled in the art will note that a stator and a printed circuit board as described hereinabove can be directly assembled with each other to form a stator-printed circuit board assembly in which the tolerances of other motor components no longer effect the position of the sensor relative to the stator. As a direct consequence of the present stator and printed circuit board, the amount of automated assembly possible for the motor 54 is greatly increased. An example of an improved method of assembly for a brushless motor of the type detailed above is found in Applicant's commonly owned, copending U.S. patent application Ser. No. 225,088 entitled "A Method of Assembling Brushless Electric Motors", incorporated herein by reference.

Also shown in FIG. 2 is the integrated circuit 108 which preferably includes a sensor element, such as a Hall effect device. As is known in the art, a brushless motor comprises a commutation circuit including a sensor for detecting the passage of the rotating permanent magnet poles with respect to the poles of an electromagnet for triggering the commutation circuitry. In known brushless motors, such as the motor 10, the Hall effect device is a discrete element manually positioned relative to the surface of the printed circuit board so that when the motor was assembled, the device was positioned at a precise angular location with respect to the stator permanent magnet poles, and was spaced from the stator poles within a preestablished range.

With a printed circuit board provided according to the present invention, the printed circuit board is molded such that a portion thereof is raised from the surface 100 so that the sensor will be properly positioned when the printed circuit board is assembled with the stator. This is accomplished in the preferred embodiment by the fabrication of the printed circuit board with an integral pedestal 110. The printed circuit board 98 also includes another, substantially planar portion 112 recessed from the plane 100 of the printed circuit board. The recessed portion is configured to be at a depth from the plane such that a standard electrical component, such as a connector, can be used. Without such a recessed portion the use of inexpensive electrical components is not possible. Instead, electrical leads must be manually soldered to the printed circuit board.

The present printed circuit board provides (1) self-fixturing of the printed circuit board with motor components, (2) accurate positioning of components such as the sensor, integrated circuit or connector and (3) allows for the use of inexpensive electrical components without modification to the existing stator, since the clearance between the receiving portion of the printed circuit board and the stator can be custom selected and incorporated into the printed circuit board mold. In contrast, known printed circuit boards used in brushless motors simply provide two dimensional location of electrical elements such as resistors, capacitors and integrated circuits.

Also shown in FIG. 2 and detailed in FIG. 3, a pedestal standoff 116 is molded to comprise an outer radial portion of the pedestal 110. The outer radial standoff 116 is integral with the pedestal, and is included to provide for more precise radial positioning of the sensor or sensor containing element, such as integrated circuit 108, and prevents portions of the rotor from rubbing on the integrated circuit as it rotates.

Referring now to FIGS. 4 and 5, there is shown a top planar view of surface 100 (FIG. 4) and a sectioned illustration of a portion of the printed circuit board 98 (FIG. 5). As shown in FIG. 5, the printed circuit board 98 is multilayered, comprising opposed first and second layers 118 and 120, with a plurality of electrical conductors, formed therebetween. The first layer 118 is electrically insulating and is configured on a second layer inner surface and the conductors. In FIG. 2, post 96 contacts the first layer. The conductors, such as conductor 122, preferably comprise deposited metal formed in a conventional manner. Surface 100 is an outer surface of the second layer.

Electrical components such as resistors 124, diodes 126 and integrated circuit 108 contact selected ones of the conductors and comprise a commutation circuit. The printed circuit board projection 104 is shown along with key standoff 106 about a central opening in the printed circuit board.

Recessed portion 112 is detailed in FIG. 4 and is configured in the preferred embodiment to receive a connector 114 shown in FIG. 2. The connector is configured so that the electrical wires (not shown) needed for connection to an external power source will pass through an opening 128. Other electrical wires pass through openings 130,132. It is preferable that the openings be provided with a chamfered edge 134,136,138 to provide a strain relief for the electrical wires.

Referring now to FIGS. 6 and 7, there is illustrated a top view of the stator support 74 (FIG. 6) and a sectioned portion thereof (FIG. 7). The stator support is one piece and preferably comprises molded plastic to include projecting tabs 140 and 142 positioned 180 degrees apart about a central opening. Also included are slots 144,146 for receiving the corresponding projections 106 from the printed circuit board. In the preferred embodiment, the printed circuit board tab 104 is configured to be received at an outer extension 148 of a stator tab, while the corresponding bearing tower recess is configured to receive an opposed inner extension 150. Those skilled in the art will note that while the tab 140 preferably comprises the snap engagement mechanisms for connecting the stator with both the printed circuit board and the bearing tower, supplemental tabs may be provided spaced about the support central opening to comprise one or the other snap engagement mechanisms.

The stator support additionally comprises a plurality of projections 152 configured about the support central opening separated by 90 degrees. The projections 152 receive the stator laminations and the electromagnet windings at a first portion 154 to form an electromagnet of known design. Each projection 152 also comprises an opposed receptacle 156 for receiving an electrical connector (157, FIG. 2) to extend therefrom. The poles of adjacent electromagnets are separated by openings 158 formed in the stator support. As detailed hereinabove, the commutating sensor is positioned beneath the stator support on the printed circuit board at a precise angular location in registration with one of the openings 158.

Although shown and described with respect to a motor having an external rotor those skilled in the art will note that the present invention can be readily adapted to motors having an internal rotor and can be used with both D.C. and A.C. motors with appropriate modification to the motor components.

Similarly, although the invention has been described hereinabove with respect to a preferred embodiment thereof, those skilled in the art will note that certain substitutions, deletions and additions thereto can be made therein without departing from the spirit and scope of the present invention.

We claim:

1. An electric motor comprising a housing, a stator and rotor in coaxial relationship therewithin, said stator comprising electromagnet means and a support means therefor, and a printed circuit board of molded construction which carries a commutating means for cooperation with said rotor, said printed circuit board being disposed adjacent one axial end of said stator and rotor and having a plurality of integral generally axial projections spaced thereabout with a first snap engagement means extending toward the stator adjacent the free end portion thereof, said stator support means having complementary second snap engagement means for cooperation with said first snap engagement means to fixedly secure said stator and printed circuit board in assembled relationship in a preferred alignment therewith and preclude relative movement therebetween.

2. The motor of claim 1 wherein said first snap engagement means comprises a first tab extending from said projection and wherein said second snap engagement means comprises a second tab extending from said stator support means.

3. The motor of claim 2 wherein said printed circuit board axial projections include ones thereof configured to be received by associated receptacles in said stator support means.

4. The motor of claim 3 further comprising a generally axial fixturing projection configured such that snap engagement of the printed circuit board with said stator is possible only in one relative position therebetween.

5. An electric motor comprising a housing, a stator and rotor in coaxial relationship therewith, said stator comprising electromagnet means and a support means therefor, a printed circuit board of molded construction which carries a commutating means for cooperation with said rotor, said printed circuit board being disposed adjacent one axial end of said stator and rotor and having a plurality of integral generally axial projections spaced thereabout with a first snap engagement means extending toward the stator adjacent the free end portion thereof, said stator support means having complementary second snap engagement means for cooperation with said first snap engagement means to fixedly secure said stator and printed circuit board in assembly relationship in a preferred alignment therewith and preclude relative movement therebetween, said printed circuit board includes a commutating means including a sensor for cooperation with said rotor affixed to an integral generally axial projection with a precisely located surface located at the free end portion thereof and generally facing said stator and rotor with said sensor mounted on said surface for cooperation with said rotor.

6. The motor of claim 5 wherein said sensor comprises a Hall cell.

7. The motor of claim 5 wherein said commutating means comprises an integrated circuit.

8. The motor of claim 7 wherein said integrated circuit includes said sensor.

9. The motor of claim 5 further comprising a tab means radially projecting from and integral with said precisely located surface for providing radial positioning of said sensor.

10. The motor of claim 5 further comprising a post means projecting from a surface of said housing and contacting said printed circuit board at a second surface thereof opposed to said surface receiving said sensor, said post for accurately locating said sensor relative to said rotor.

11. The motor of claim 5 further comprising a discrete electrical connector, and wherein said recessed surface portion of said printed circuit board is configured to receive said discrete electrical connector.

12. The motor of claim 4 wherein said printed circuit board further comprises:
a first layer with openings therein for providing electrical insulation;
a plurality of conductors, selected ones of which register with corresponding ones of said openings; and
a second layer of molded plastic construction having an inner surface configured to receive said first layer and said conductors, said second layer having a plurality of openings registered with certain ones of said conductors and first layer openings, and further having an opposed outer surface with a plurality of integrally formed first and second projections therefrom spaced about a peripheral surface of a inner central openings ian the printed circuit board, each of said projections configured to be in registration with and adapted to be received by a respective one of said stator projections and receptacles, said second layer projections respectively configured to affix the printed circuit board to said stator in a preferred alignment and preclude relative movement therebetween.

13. A motor comprising:

a housing;

a rotor and having a central shaft and a permanent magnet located on a rotor periphery;

a stator formed from first and second members configured to be coaxial with said rotor, said stator first member receiving an electromagnet and further having a first snap engagement means configured in a stator first member central tubular support means, said stator second member adapted to be received by an upper portion of said first stator member;

a bearing tower centrally positioned in the housing and extending from an interior surface thereof and terminating at an upper end portion, said bearing tower adapted to slidably receive at an outer surface thereof said tubular support means and further having a second snap engagement means adjacent said housing interior surface and disposed away from said bearing tower upper end portion, said bearing tower second snap engagement means cooperative with said stator first member snap engagement means to secure said bearing tower and stator in assembled relationship.

14. The motor of claim 13 wherein said first snap engagement means comprises a tab extending from said tubular support means and said second snap means comprises a complementary recess formed in said bearing tower outer surface.

15. The motor of claim 14 wherein said tab and said recess are configured to preclude relative movement between said bearing tower and said stator.

16. The motor of claim 13 wherein said first and second snap engagement means are configured so that an assembled relationship between said stator and housing is possible only in one relative angular position.

17. A motor comprising, a housing;

a rotor having a central post and at least one permanent magnet located on a rotor periphery;

a stator formed from first and second members configured to be coaxial with said rotor, said stator first member receiving an electromagnet and further having a first snap engagement means configured on an inner surface of a stator first member central tubular support means, said stator second member adapted to be received by an upper portion of said first stator member, said stator first member further having a plurality of second snap engagement means spaced about an outer surface of said tubular support means;

a bearing tower centrally positioned in the housing and extending from an interior surface thereof and terminating at an upper end portion, said bearing tower adapted to slidably receive at an outer surface thereof said stator first member tubular support means and further having a snap engagement means adjacent said housing interior surface and disposed away from said bearing tower upper end portion, said bearing tower snap engagement means cooperative with said stator first member first snap engagement means to secure said bearing tower and stator in assembled relationship; and a commutation means, including a printed circuit board having a first layer with openings therein for providing electrical insulation;

a plurality of conductors, selected ones of which register with corresponding ones of said openings; and a second layer of molded plastic construction having an inner surface configured to receive said first layer and said conductors, said second layer having a plurality of openings registered with certain ones of said conductors and first layer openings, and further having an opposed outer surface with a plurality of integrally formed projections therefrom spaced about a peripheral surface of a inner central opening in the printed circuit board, each of said printed circuit board second layer projections configured to be in registration with and adapted to be received by a respective one of said stator first member second snap engagement means, said printed circuit board second layer projections configured to affix the printed circuit board to said stator in a preferred alignment and preclude relative movement therebetween.

18. The electric motor of claim 17, wherein said printed circuit board is disposed adjacent one axial end of said stator and rotor and includes a mounting means on a side thereof facing the stator and rotor with an integrated circuit element, including a commutating and sensing means, supported on said mounting means and precisely located for cooperation with said rotor.

19. The electric motor of claim 17 wherein said printed circuit board is disposed adjacent one axial end of said stator and rotor and having at least one generally axial integral projection extending toward the stator and rotor with an integrated circuit element including a commutating and sensing means mounted on said axial projection and precisely located for cooperation with said rotor.

20. The motor of claim 19 wherein said sensing means comprises a magnetic sensor.

21. The motor of claim 20 wherein said magnetic sensor comprises a Hall effect device.

22. The motor of claim 19 further comprising a tab means radially projecting from said commutating and sensing means axial projection for providing radial positioning of said integrated circuit.

* * * * *